US012736855B2

(12) United States Patent
Schröer et al.

(10) Patent No.: US 12,736,855 B2
(45) Date of Patent: Sep. 15, 2026

(54) AUTOFOCUS METHOD AND ASSOCIATED OPTICAL IMAGING SYSTEM

(71) Applicant: Schölly Fiberoptic GmbH, Denzlingen (DE)

(72) Inventors: Stefan Schröer, Freiburg (DE); Christian Drobnik, Vörstetten (DE)

(73) Assignee: Scholly Fiberoptic GmbH, Denzlingen (DE)

( * ) Notice: Subject to any disclaimer, the term of this patent is extended or adjusted under 35 U.S.C. 154(b) by 557 days.

(21) Appl. No.: 18/302,133

(22) Filed: Apr. 18, 2023

(65) Prior Publication Data

US 2023/0333452 A1 Oct. 19, 2023

(30) Foreign Application Priority Data

Apr. 19, 2022 (DE) ......................... 102022109398.0

(51) Int. Cl.

| | |
|---|---|
| ***G03B 13/36*** | (2021.01) |
| ***G02B 3/00*** | (2006.01) |
| ***G02B 13/00*** | (2006.01) |
| ***G03B 13/20*** | (2021.01) |
| ***H04N 23/12*** | (2023.01) |

(52) U.S. Cl.

CPC ........... *G03B 13/36* (2013.01); *G02B 3/0075* (2013.01); *G02B 13/009* (2013.01); *G03B 13/20* (2013.01); *H04N 23/12* (2023.01)

(58) Field of Classification Search

CPC ...... G03B 13/36; G03B 13/20; G02B 3/0075; G02B 13/009; G02B 7/38; H04N 23/12

See application file for complete search history.

(56) References Cited

U.S. PATENT DOCUMENTS

| | | | | |
|---|---|---|---|---|
| 2004/0061049 A1 | 4/2004 | Curry et al. | | |
| 2005/0270410 A1 | 12/2005 | Takayama | | |
| 2013/0002537 A1* | 1/2013 | Mise | G03B 13/00 | 345/156 |
| 2014/0043702 A1* | 2/2014 | Yagi | G02B 7/02 | 359/823 |
| 2015/0177504 A1* | 6/2015 | Bickert | G02B 21/34 | 348/80 |
| 2016/0198076 A1 | 7/2016 | Fujimoto et al. | | |
| 2018/0316870 A1 | 11/2018 | Yoshino | | |
| 2022/0180492 A1* | 6/2022 | Hung | G06T 5/50 | |

* cited by examiner

*Primary Examiner* — Twyler L Haskins
*Assistant Examiner* — Surafel Yilmakassaye
(74) *Attorney, Agent, or Firm* — Volpe Koenig

(57) ABSTRACT

To improve the accuracy and the speed of an autofocus method, using which a present best focal plane (13) may be found in an automated manner, which enables a best possible image quality for an object (3), which is located at a specific working distance (11) to an optical imaging system (1), it is provided that at least one parameter used during a z-scan (17) be adapted in an automated manner as a function of a presently set optical zoom level and/or a current estimated value of the working distance (11). During the z-scan (17), a present location of a focal plane (12) of the optical imaging system (1) is displaced within a scanning range (14) along an optical z-axis (8) of the imaging system (1), wherein the individual focal planes (12) are each evaluated to identify the best focal plane (13) among them.

15 Claims, 3 Drawing Sheets

AUTOFOCUS METHOD AND ASSOCIATED OPTICAL IMAGING SYSTEM

CROSS-REFERENCE TO RELATED APPLICATIONS

This application claims priority from German Patent Application No. 10 2022 109 398.0, filed Apr. 19, 2022, which is incorporated herein by reference as if fully set forth.

TECHNICAL FIELD

The invention relates to an autofocus method, thus a method for automatically finding a present best focal plane. In this method, the location of a focal plane of the optical imaging system is displaced within a scanning range along an optical z-axis by tuning a focus lens of an optical imaging system. This displacement of the focal plane is also designated as a z-scan. The tuning of the focus lens can be achieved, for example, by displacing the focus lens and/or by tuning the focus lens (if this is designed so it is tunable).

Furthermore, the invention relates to an associated optical imaging system, using which such an autofocus method may be implemented. This imaging system can be used in particular to visualize an object during a medical intervention. The imaging system comprises a zoom optics unit for this purpose, which is adjustable by means of a zoom actuator to adjust an optical zoom level; furthermore, a focus lens which is tunable by means of a focus actuator (thus displaceable and/or tunable) in order to adjust the location of a focal plane along an optical z-axis; an image sensor for recording image data; and finally a controller for activating the focus actuator and/or the zoom actuator.

BACKGROUND

Autofocus (AF) designates in general the technology of a camera or also other optical devices for automatically focusing on an object to be observed. A distinction is made here between active autofocus, which also functions without ambient light, and passive autofocus, in which only the light emitted or reflected by the object is used for focusing. Moreover, assessing individual focal planes with regard to the respective image quality in passive autofocus systems, for example by phase comparison or by contrast measurement, in particular an edge contrast measurement, and thus finding the location of the best focal plane is known. The best focal plane corresponds here in particular to that plane closest to the plane in which the object is located.

Autofocus methods as described at the outset are known and are used in manifold forms, in particular in medical visualization systems, such as endoscopes, exoscopes, or microscopes. In particular in medical microscope applications in which a variable optical zoom is used and a working distance (defined as the distance between the last front lens of the objective formed by the microscope and the object observed using the microscope) changes, the depth of field also changes depending on the setting of the optical zoom and the current working distance. Depth of field is understood in general as the extension of the area in front of and behind the focal plane (sometimes also designated as the focus plane), in which a point is still imaged sufficiently sharply. The focal plane is the plane in the object space, the points of which are imaged by the imaging system as sharp points on the image plane (which typically corresponds to the plane of the image sensor) in the image space. Points outside the focal plane, in contrast, are imaged as circles or ellipses on the image plane/the image sensor, thus with a certain fuzziness. Up to a certain size, these scatter circles still appear approximately punctiform, however, which has the result that objects which are located outside the focal plane, thus in the object space in front of or behind the focal plane, are still imaged sufficiently sharply. In other words, the depth of field thus defines the range of possible focal planes in which an image is still perceived as sharp or can be reproduced/recorded by an image sensor with adequate image quality.

In previously known autofocus methods, for example contrast-based autofocus methods, the location resolution, using which the individual focal planes are scanned, is typically always selected to be less than the minimum depth of field of the optical system which is used for imaging. The depth of field, as already mentioned, is dependent here on the working distance and on the set optical zoom. Such a small step width in the scanning of the focal planes offers the advantage that the respective location of that focal plane which supplies an optimum image quality for a specific object, which is located at a given working distance to the front lens, can be determined with sufficient accuracy. This focal plane is designated hereinafter as the best focal plane.

On the other hand, however, the described scanning of the possible focal planes with the smallest possible step width has the result that the autofocus method becomes inefficient or slow with respect to time, because overscanning often takes place. In contrast, if the spatial resolution is reduced in the scanning of the different focal planes to thus accelerate the method, there is the risk that the best focal plane, in particular with currently low depth of field, can no longer be found with sufficient accuracy.

Zoom factor is typically understood in such systems as the ratio between the longest and the shortest zoom focal length, which is settable with the aid of a zoom objective.

In contrast, zoom level is understood as the zoom focal length which is presently set. In this case, there are systems which implement a step zoom or the zoom is varied continuously. With short zoom focal length (wide angle), there is thus a small zoom level, so that a comparatively large image detail is imaged and only a low level of magnification is achieved. With greater zoom focal length (telephoto), in contrast, a high zoom level is achieved, so that only a small image detail is imaged and therefore a high level of magnification is achieved. In other words, the change of the zoom always causes a change of the optical magnification. In this case, there are zoom objectives which do not change the location of the image plane (focal plane) upon change of the zoom focal length. In this case, the image remains sharp, but the image detail which is imaged is changed, so that the image magnification changes. Upon a zoom-in (increase of the zoom level/the zoom focal length), the image magnification is thus increased, so that a close-up view of the object is obtained. Upon a zoom-out (reduction of the zoom level/the zoom focal length and thus the image magnification), a distant view of the object is accordingly supplied. Depending on the zoom optics unit used, a shift of the focal plane can also occur in this case (upon change of the zoom level), which can be eliminated relatively easily by refocusing with the aid of a focus lens, however.

SUMMARY

Against this background, the invention is based on the object of providing an improved autofocus method and also optical imaging systems suitable for this purpose, which enable the most accurate possible determination of the best focal plane, wherein the speed in the determination is also to be increased.

One or more of the features of the method disclosed herein are provided to achieve this object. In particular, to achieve the object in a method of the type described at the outset, it is thus provided according to the invention that at least one parameter of the z-scan is automatically adapted as a function of a currently set optical zoom level of the imaging system and/or as a function of a current estimated value for a working distance, which exists between the imaging system and an object visualized using the imaging system. Due to the dynamic adaptation of the at least one parameter and thus of the z-scan in reaction to a change of the zoom level or the estimated value for the working distance, the method can thus always execute a z-scan adapted in the best possible manner to the current recording situation and thus accelerate finding the best focal plane.

As soon as the best focal plane is identified/found with the aid of the autofocus method, the focus lens can be tuned so that the best focal plane is imaged on the image sensor. I.e., the focus lens can be tuned so that the finally set present focal plane corresponds to the best focal plane. This finally set present focal plane can then be used to record sharp images of the object with the aid of the optical imaging system (and an image sensor). The best focal plane can correspond in this case to one of the previously scanned planes.

It is to be noted at this point that the focus lens can also be formed, of course, by a complex lens group; this lens group can also include multiple tunable focus lenses. For example, an axially displaceable first focus lens can be used for the coarse displacement of the focal plane and an additional tunable liquid lens for the fine displacement of the focal plane.

However, it is also possible in particular to determine a location of the best focal plane, which lies just between two focal planes scanned during the z-scan, with the aid of methods of interpolation. For example, from support points of a curve of the image contrast along the z-axis, which were determined with the aid of the z-scan, a model of the curve can be interpolated and the maximum of the image contrast and thus the location of the best focal plane can be found. In such a case, it can occur that the focal plane finally set by tuning the focus lens (=best focal plane) does not correspond to any of the previously optically scanned focal planes, but rather it is located between two such focal planes. The location resolution in the determination of the best focal plane can be further improved by such an interpolation approach.

The method according to the invention can also provide that the respective present focal plane, which is set within the scanning range by tuning the focus lens, is detected and evaluated with the aid of an image sensor. Typical passive or also active autofocus (AF) methods can be used for evaluating the focal plane. For example, the respective focal plane can be evaluated by a phase comparison and/or by a contrast measurement, in particular an edge contrast measurement. Image processing algorithms can also be used, which identify the object in the respective recorded images and assess the quality of the reproduction of the object. An artificial intelligence can also be used for this purpose, for example based on training data sets of images/objects.

Such previously known methods thus permit that focal plane (=best focal plane) to be identified which supplies the best image quality for the object to be visualized, which typically corresponds to a high image contrast. It is preferred if the location of the best focal plane is ascertained on the basis of an image evaluation of the focal planes optically scanned by means of the z-scan. For example, by means of image evaluation, the one of the scanned focal planes can be identified as the best focal plane which supplies a maximum value with respect to an image contrast, in particular an edge contrast, and/or with respect to location frequencies ascertained by means of a Fourier transform.

If an active autofocus (AF) is used, the working distance can be estimated, for example, using a distance measurement (for example by means of ultrasound). Moreover, it is possible to actively illuminate the object, for example using an AF auxiliary light, which is in particular not visible.

The focal plane can be displaced within the scanning range, for example, in that the focus lens is displaced along the optical axis of the imaging system. In contrast, if the focus lens is designed as a tunable lens (for example as a tunable membrane or liquid lens), the focal plane can also be displaced in that the focus lens is tuned. Of course, these approaches can also be combined with one another.

According to the invention, the above-mentioned object can also be achieved by further advantageous embodiments according to the dependent claims, which are to be explained hereinafter:

The at least one parameter can comprise, for example, a length of the mentioned scanning range or the z-scan and/or a number of focal planes (within the scanning range) optically scanned using the z-scan and/or a spatial scanning frequency of the z-scan (i.e., how many focal planes/mm are scanned; example: a spatial scanning frequency of 10 focal planes/4 mm) and/or an adjustment speed of the focus lens and/or an optical zoom level of the imaging system which is used during the z-scan. Depending on the situation, all of these parameters (scanning length/#focal planes/scanning frequency/adjustment speed/zoom level) can be adapted simultaneously or only one or individual ones of these parameters can be adapted at a specific point in time. Mutual dependencies can also exist in this case: If the image sensor is always read out at a constant image frequency (number of recorded images/second), for example, but the adjustment speed of the focus lens is reduced, the spatial scanning frequency thus automatically increases and possibly also the number of scanned focal planes within a specific scanning length, because now more images are recorded for a specific adjustment distance of the focus lens (and thus for an associated defined optically scanned scanning length in mm), i.e., the spatial distances of the focal planes which correspond to the respective images (on average) are shortened.

Of course, it is also possible to implement a method according to the invention exclusively by adapting only one of these parameters. As will be shown in detail hereinafter, finding the best focal plane can be significantly accelerated and the accuracy in the determination of the best focal plane can also be improved by such methods.

Since the length of the z-scan can vary, but it is often sufficient to execute the z-scan within a maximum available scanning time, it can be provided in particular that the spatial scanning frequency is increased as soon as the length of the scanning range is shortened. This can in particular be designed so that the total time which is required in each case to carry out the z-scan (wherein this total time is fundamentally limited by the maximum possible scanning frequency of the image sensor used and the maximum adjustment speed of the focus lens) is kept constant. A predetermined maximum total time for the z-scan which is available can thus be optimally utilized in each case (either for a comparatively long z-scan or for a comparatively high resolution z-scan).

Therefore, by way of the adaptations provided by the invention, either the depth of field can be actively adapted (by changing the zoom level) and/or a present change of the depth of field can be compensated for in that a corresponding adaptation of the z-scan takes place (adaptation of scanning frequency and/or length and/or number of scanned focal planes).

For example, it is particularly advantageous if the adaptation of the length of the scanning range and/or the number of scanned focal planes within the scanning range and/or the scanning frequency and/or the optical zoom of the imaging system during the z-scan (each) take place as a function of a currently set optical zoom level of the imaging system and/or as a function of a current estimated value for a working distance which exists between the imaging system and an object visualized using the imaging system. In other words, the adaptation of the length of the scanning range and/or the number of scanned focal planes and/or the scanning frequency and/or the zoom level used during the z-scan can thus be adapted in reaction to a zoom level set presently (thus previously by the user) and/or in reaction to the change of a (current) estimated value for the working distance (in particular in each case).

By such dynamic adaptations, the method can adapt itself automatically to a current recording situation and select the parameters of the method so that the best focal plane can be found quickly and with high accuracy. In such an approach it is particularly preferred if the estimated value for the working distance is ascertained with the aid of an additional sensor, for example a contactless distance sensor, thus in particular an ultrasonic sensor and/or on the basis of an additional item of location information with respect to a present spatial location of the imaging system and/or with the aid of an additional camera. This is because all of these approaches permit a sufficient accuracy to be enabled in the determination of the working distance and a current estimated value to be reliably supplied quickly in each case upon change of the working distance, on the basis of which the method can adapt itself. The estimated value for the working distance can thus be used in a reasonable manner (in particular at sufficiently high speed) to perform the described adaptations of the z-scan. An optimally adapted autofocus method can thus be carried out in each case for arbitrary working distances.

By way of this approach, it is possible in particular that only a required minimum number of scanned focal planes within a scan are always acquired to find the best focal plane, which accelerates the finding. Without adaptation of the length of the scanning range and/or the number of scanned focal planes (within a z-scan carried out within the scanning range), as provided here, in many cases, namely when the depth of field is presently very small, an unnecessarily large scanning range is traversed or unnecessarily many focal planes are acquired, which slows the autofocus, i.e., the time until finding the best focal plane lengthens accordingly. This is effectively avoided by the method according to the invention.

The present estimated value for the working distance can be ascertained, for example, from a 3D depth map, which has been ascertained with the aid of the additional camera. Or, for example, from a control signal, using which a robot arm is moved, which carries the optical imaging system and thus supplies an additional item of location information with respect to a present spatial location of the imaging system.

If the optical zoom level increases, for example because the user zooms in, the length of the scanning range can thus be shortened. Alternatively or additionally, the number of scanned focal planes within the scanning range can also be reduced. In this way, it is taken into consideration that upon increase of the optical zoom level (=zoom-in), the depth of field decreases, which requires a higher z-resolution. For example, if a constant step width is maintained, the shortening of the scanning range will automatically result in a smaller number of scanned focal planes, which accelerates the method. In both cases, finding the best focal plane can be accelerated because the required length of the scanning range and/or the number of scanned focal planes is adapted dynamically to the present requirements.

In contrast, if the estimated value for the working distance decreases, the length of the scanning range can thus be shortened and/or the number of scanned focal planes within the scanning range can be reduced. This is because a decreasing working distance also has the effect that the depth of field decreases.

One possible embodiment of the above-described autofocus method provides that the scanning range is traversed step-by-step (discontinuous z-scan). For this purpose, the location of the focal plane can be displaced step-by-step in a step width. This can be achieved, for example, in that the focus lens is moved by a corresponding movement distance or is tuned by a certain absolute value. It is particularly advantageous if the step width is adapted as a function of the presently set optical zoom level and/or said estimated value for the working distance.

It is reasonable, for example, if upon increase of the zoom level and accompanying increasing image magnification and/or upon decrease of the estimated value for the working distance, the step width is reduced in each case. This is because upon increase of the zoom level (=zoom-in), the depth of field (DOF) decreases. The reduced step width then results in a higher z-resolution upon finding the best focal plane. Similarly, the depth of field (DOF) will decrease if the working distance decreases. I.e., a higher z-resolution is also required in this case, which is enabled by the reduced step width.

By way of the above approach, it is possible in particular to avoid the step width being selected excessively large, so that the best focal plane cannot be found with sufficient accuracy, and, on the other hand, that excessively many focal planes (support points) have to be passed through and acquired to ascertain the location of the best focal plane.

An alternative embodiment of the method to the step-by-step scanning of the focal planes provides that the scanning range is traversed continuously. This can take place, for example, in that the location of the focal plane is continuously displaced within the scanning range (continuous z-scan). It is obvious that for this purpose said focus lens can be continuously displaced or continuously tuned. In such a procedure, the focus lens can thus be moved with constant movement speed and/or continuously.

In other words, the location of the focal plane can thus be displaced continuously along the z-axis, which can also be achievable, for example, by continuous tuning of the focus lens. To now achieve an acceleration of the autofocus method, it can be provided that a mean scanning speed, at which the location of the focal plane is displaced along the z-axis, is adapted. This adaptation can preferably also take place as a function of a presently set optical zoom level and/or an estimated value for the working distance.

It is particularly preferable in this case if the mean scanning speed (of the z-scan) is reduced upon increase of the zoom level and accompanying increasing image magnification and/or upon decrease of the estimated value for the working distance.

The reduction of the scanning speed offers the advantage that for a given maximum image rate of an image sensor, at which the focal planes are acquired/scanned and for a given length of the scanning range, more scans can be performed or a smaller effective step width can be implemented. The z-resolution can also be increased in this way.

It is to be noted at this point that the speed at which the focal plane is displaced along the z-axis within the scanning range can increase or decrease, even if, for example, the focus lens is moved at constant speed. The cause of this can be a nonlinear relationship between the position of the focus lens and the location of the focal plane. The scanning speed can thus accelerate during a z-scan, for example, even if the focus lens is displaced at a constant speed. For better comparison, it is therefore possible to settle on a mean scanning speed which is achieved during the z-scan. This also applies for a continuous tuning of the focus lens, because in this case as well the location of the focal plane can change in a nonlinear manner, so that the scanning speed can accelerate or slow, depending on the scanning direction (in + or −z-direction).

In the described autofocus method, in particular an image sensor can be used, using which the different focal planes can be acquired or scanned as individual images. This image sensor can in particular be part of the described optical imaging system. For this purpose, the image sensor can be operated in particular in a so-called rolling shutter mode. In this case, different image areas of the individual images recorded using the image sensor will correspond to different z-positions along the optical z-axis. This is because the respective individual image is recorded while the location of the focal plane changes. In such a case, it is preferred if an evaluation area within the respective individual image, which is evaluated to assess the respective focal plane, is adapted as a function of a mean scanning speed and/or a number of focal planes to be acquired. For example, it is advantageous if the evaluation area is shrunken as soon as the scanning speed is increased. Furthermore, it can be reasonable to shrink the evaluation area if the number of focal planes to be acquired is to be increased.

At high scanning speed, thus rapid displacement of the location of the focal plane along the z-axis (due to corresponding rapid tuning of the focus lens), the image sharpness will change strongly within an individual image (image frame) recorded using the image sensor, thus display a high level of variability. Accordingly, the image area to be evaluated thus has to be made smaller in order to achieve a sufficiently high z-resolution. In contrast, if the scanning speed is lower, the same image area thus corresponds to an even smaller step width in the z-direction, so that then the image area can be made larger again if necessary. More accurate scanning in the z-direction is thus enabled by shrinking the evaluation area, since the shrunken image area corresponds to a shrunken z-range along the optical axis.

To find the best focal plane, at least two z-scans can also be carried out in succession within the scanning range. For this purpose, the location of a present focal plane within the scanning range can be displaced in each case. The two z-scans can differ in their respective length (measured in mm) and/or in a step width used (measured in mm) and/or in a scanning speed used (measured in mm/sec) and/or in their respective location within the scanning range (z-coordinate). In all of these cases, however, it is preferred if the two z-scans at least partially overlap. This is because in this case an item of information from the first scan can be used to position the second scan within the scanning range.

For rapid and effective finding of the location of the best focal plane, it is preferable in this case if the length of a first coarse scan is longer and/or its step width is larger and/or its scanning speed is higher than the length/step width/scanning speed which is applied in a following fine scan.

The length of the respective z-scan can be specified in mm, as can the respective step width. The scanning speed at which the location of the focal plane is moved within the scanning range can be specified, for example, in mm/sec.

A large scanning range in the z-direction can be accompanied, for example, by a high movement speed of the focus lens/a high scanning speed. At given maximum image rate of the image sensor, the resolution can thus be limited in the z-direction; however, a large scanning range can thus be traveled in a short time.

A small scanning range in the z-direction can be accompanied, for example, by a comparatively slow movement speed of the focus lens/a slow scanning speed. A high resolution in the z-direction can thus be achieved. This suggests itself if an area of interest was previously identified in the coarse scan.

By way of this two-step procedure, an acceleration and also a high accuracy of the autofocus are thus enabled. It is obvious that this concept may also be expanded, for example, to three or more steps, so that subsequently three or more scans are thus carried out, for example with increasingly higher location resolution in the z-direction.

One particularly preferred embodiment provides that the at least two z-scans comprise a coarse scan and a fine scan following with respect to time. The coarse scan can take place at a lower zoom level and thus with lower image magnification than the fine scan. Furthermore, it is preferred if before the coarse scan is carried out, initially a minimal zoom level is set and/or if the coarse scan is executed over a maximum possible scanning range (which can be scanned by tuning the focus lens).

In this case, in particular subsequently even before the fine scan is carried out, a last zoom level set by the user (thus desired by the user) can be reestablished. In this way, it can be ensured that the fine scan is executed in the zoom level which is to be/is used subsequently for the recording of image data.

By carrying out the coarse scan at low zoom level, in contrast, the depth of field is initially increased, which has the result that a larger step width can be sufficient to predetermine the location of the best focal plane quickly and coarsely (at reduced spatial resolution).

If the at least two z-scans comprise a coarse scan and a fine scan following with respect to time, it can also be provided that a local z-resolution of the fine scan is higher than a local z-resolution of the coarse scan. It can furthermore also be provided that a length of the coarse scan is greater than a length of the fine scan. Furthermore, it can also be provided that a step width of the coarse scan is greater than a step width of the fine scan. And finally, a scanning speed of the coarse scan can also be higher than a scanning speed of the fine scan. Furthermore, it is preferred if the fine scan takes place in the opposite scanning direction to the coarse scan. The last feature has the advantage that a return movement of the focal plane to the starting point of the fine scan is shortened, which accelerates the method. This also applies if the fine scan is located within the scanning range of the coarse scan.

To achieve the object mentioned at the outset, furthermore an optical imaging system is provided, which can be designed in particular as described at the outset. This optical imaging system, which can be designed, for example, as an exoscope or microscope or endoscope, is distinguished in that the controller is configured to implement an autofocus and for this purpose to activate the focus actuator and/or the zoom actuator (in each case) as a function of a presently set zoom level (previously with the aid of the zoom actuator) and/or as a function of a (current) estimated value for a present working distance between the imaging system and the object.

Depending on the application, the controller can thus be configured to activate the zoom actuator shortly before the z-scan, in order to thus adapt the zoom level which is used during the z-scan. This can take place, for example, in reaction to an input of a user, who had previously adapted the zoom level to a value which is suboptimal for the z-scan to be executed and is therefore to be corrected in order to accelerate finding the best focal plane.

As previously explained, tuning of the focus lens can be understood here as a displacement of the focal plane of the imaging system, either by displacing the focus lens in the case of a non-tunable lens/fixed focal length lens or by tuning the focus lens in the case of a tunable lens, wherein a tunable lens can also additionally be displaced in order to adapt the location of the present focal plane.

By the actuation of the focus actuator, the controller can implemented using one or more of the method steps disclosed herein, thus, for example, adapt the length of the scanning range and/or a number of scanned focal planes within the scanning range as a function of the zoom level or the estimated value. In this way, not only may the accuracy of the autofocus method be improved, rather the method may also be accelerated in this way, as was already explained above.

Furthermore, it is also possible that the controller additionally or alternatively adapts the zoom level which is used during the z-scan by activating the zoom actuator. For this purpose, the controller thus changes the optical zoom of the imaging system shortly before the z-scan is carried out, wherein this can also take place as a function of the zoom level or the estimated value for the working distance. As previously explained with reference to carrying out a coarse scan and a following fine scan, such an adaptation of the zoom can also have the result that the autofocus method is accelerated and/or improved in its accuracy.

In other words, it is thus particularly valuable if the controller is configured to activate the focus actuator and/or the zoom actuator so that an autofocus method as claimed in one of the claims directed to such a method or as described herein is implemented.

Finally, it is also to be noted that the optical imaging system can be designed as a medical visualization system, thus in particular as an endoscope, an exoscope, or microscope. In this case, the image data which are acquired using the image sensor can be displayed, for example, on an external monitor in order to visualize the object observed using the visualization system for a user. The imaging system can thus implement a video camera, for example.

BRIEF DESCRIPTION OF THE DRAWINGS

The invention will be described in more detail on the basis of exemplary embodiments, but is not restricted to these exemplary embodiments. Further designs of the invention can be obtained from the following description of a preferred exemplary embodiment in conjunction with the general description, the claims, and the drawings.

In the following description of various preferred embodiments of the invention, elements corresponding in their function receive corresponding reference numerals even with differing design or formation.

In the figures:

Figure 1:
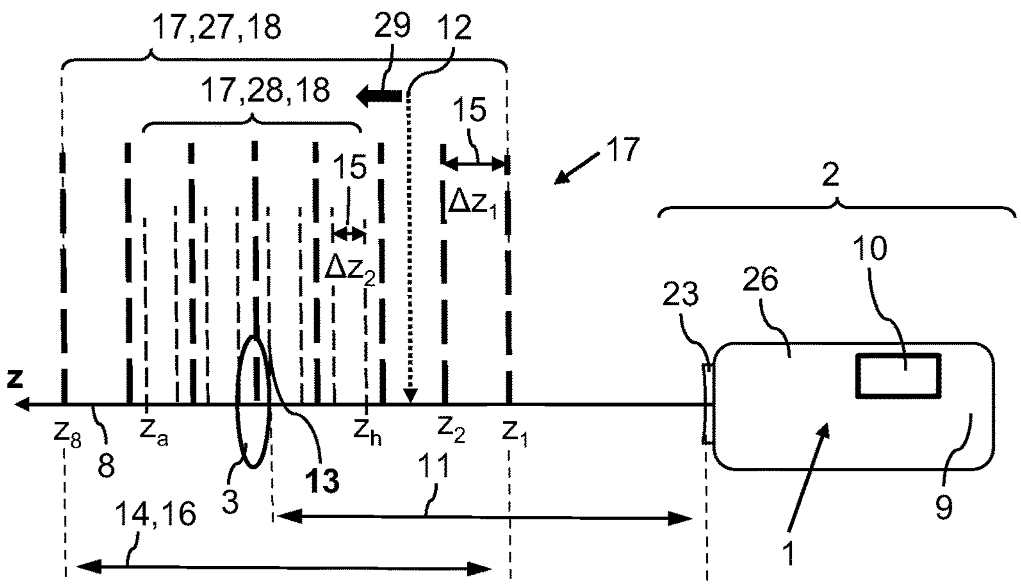
Figure 2:
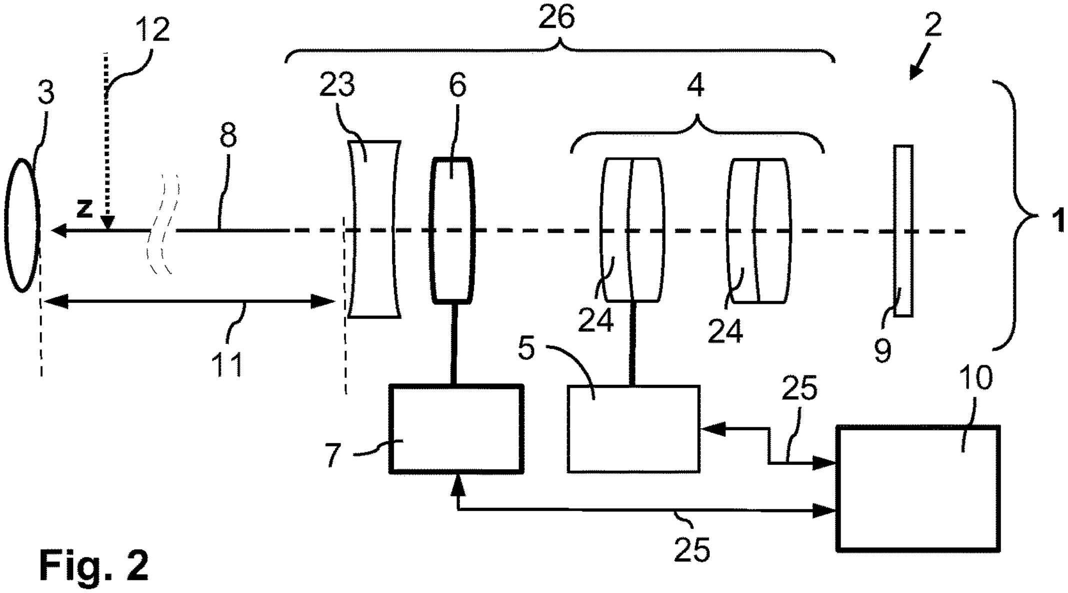
Figure 3:
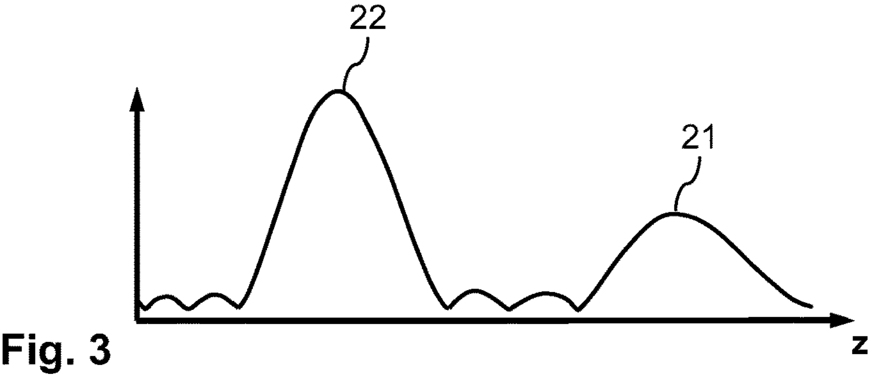
Figure 4:
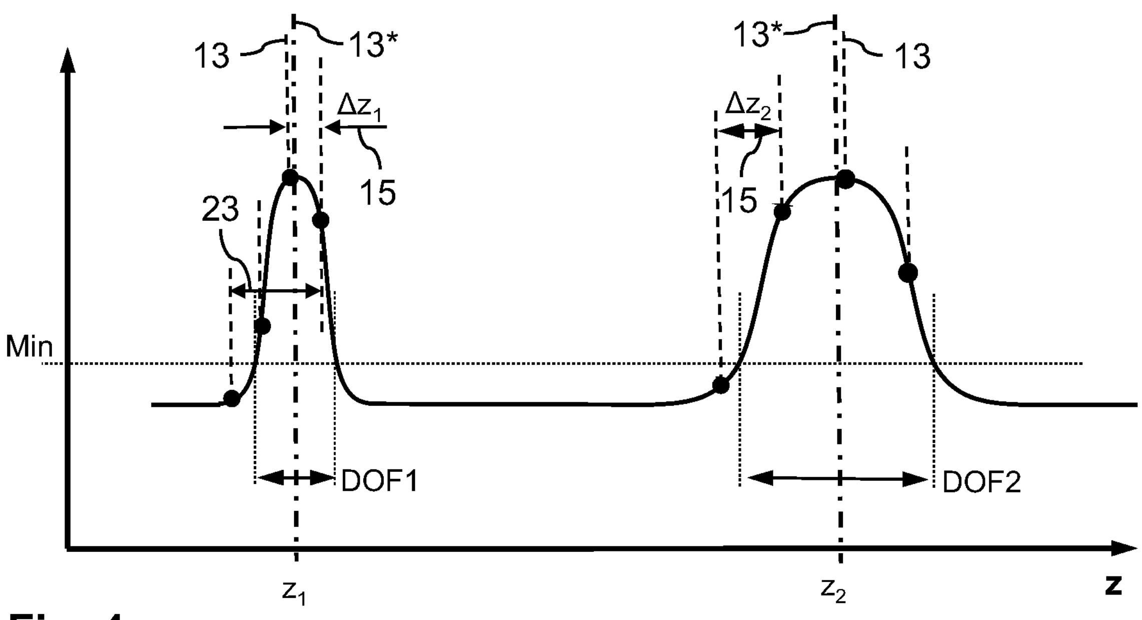
Figure 5:
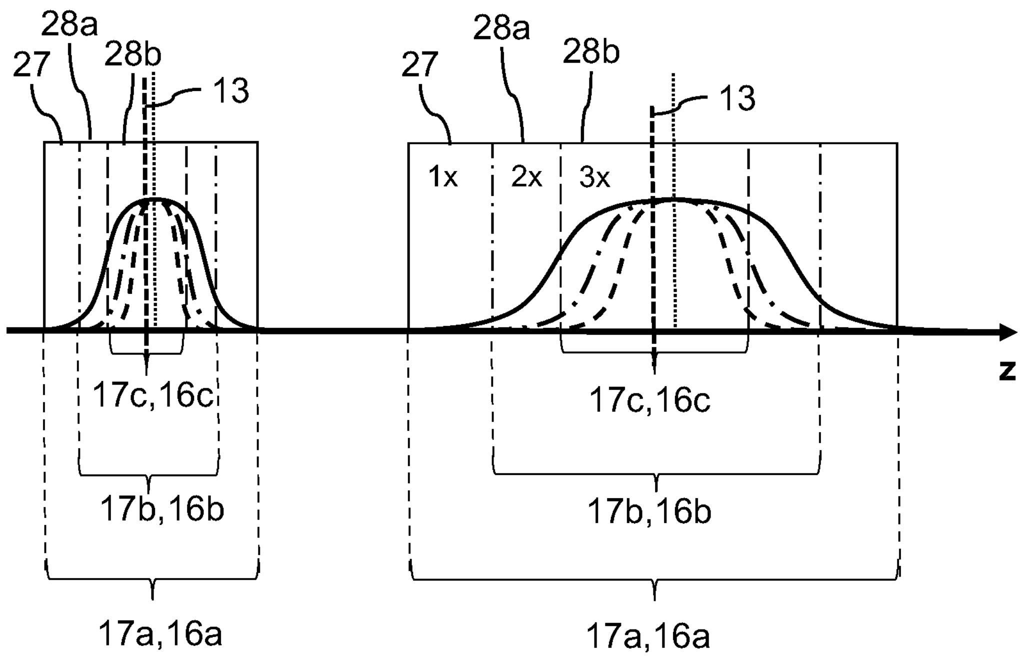
Figure 6:
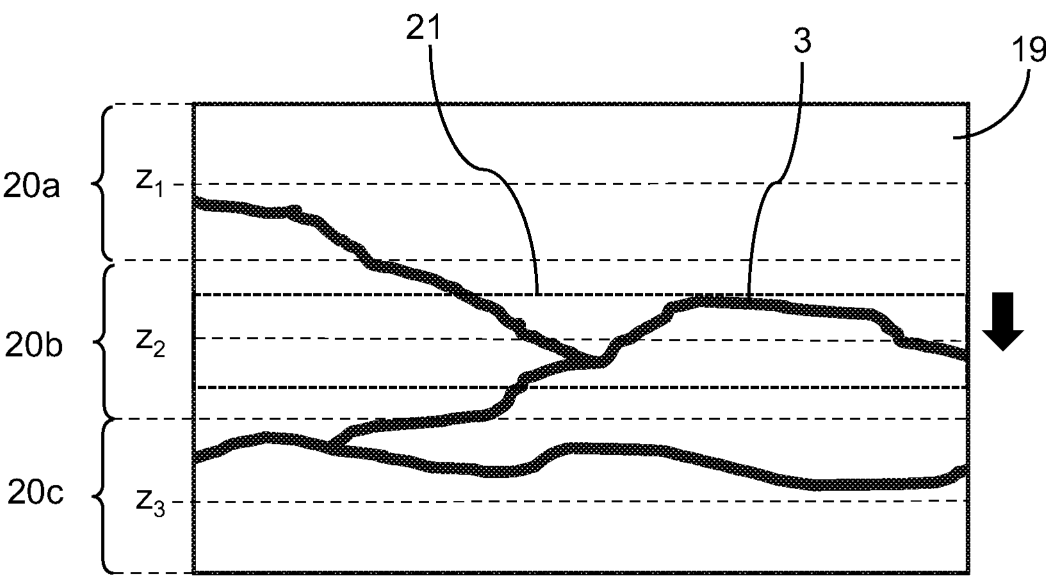
Figure 7:
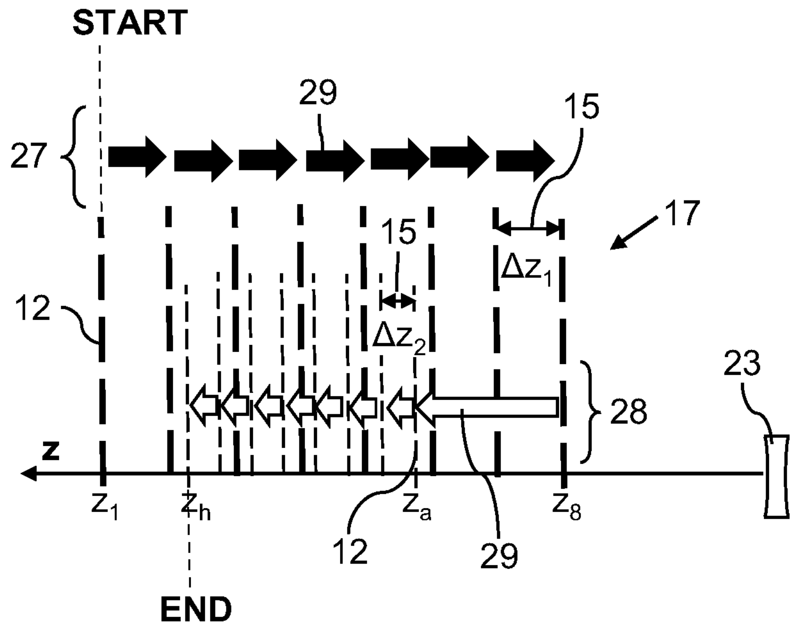

FIG. 1 shows a schematic sketch of a typical application situation of an imaging system according to the invention, which is used to observe an object, FIG. 2 shows individual components of the imaging system from FIG. 1 as well as actuators and a controller, FIG. 3 shows a greatly simplified illustration of the curve of an image contrast along the optical z-axis, FIG. 4 shows an illustration of two z-scans carried out in different situations, to find the location of a best focal plane in each case, FIG. 5 shows a further illustration of an autofocus method according to the invention, which comprises a coarse scan and two following fine scans, FIG. 6 shows an individual image recorded using an image sensor of the imaging system shown in FIG. 1, and FIG. 7 shows the individual steps when running an autofocus method according to the invention, which comprises a coarse scan and a fine scan.

DETAILED DESCRIPTION

FIG. 1 shows an optical imaging system 1 according to the invention, which is configured to visualize an object 3 during a medical intervention. For this purpose, the optical imaging system 1 includes a zoom optics unit 4, which is adjustable by means of a zoom actuator 5 in order to adapt an optical zoom level, as illustrated in FIG. 2, which shows the internal components of the optical imaging system 1 in detail. In addition, the imaging system 1 includes a focus lens 6, which is tunable by means of a focus actuator 7 in order to displace the present location of a focal plane 12 along the optical z-axis 8, as illustrated in FIGS. 1 and 2. A controller 10 is provided for activating the focus actuator 7 and the zoom actuator 5.

The dashed vertical lines in FIG. 1 indicate the z-positions (for example $z_1$ to $z_8$), in which the focal plane 12 is positioned during a z-scan 17. I.e., the respective dashed vertical line in FIG. 1 indicates the position of that plane which—as a result of the tuning of the focus lens 6—is presently sharply imaged on the image sensor 9 and is thus optically scanned.

As can be seen in FIG. 2, the zoom optics unit 4 includes two zoom lenses 24, each designed as achromatic lenses, wherein the front zoom lens can be displaced with the aid of the zoom actuator 5 along the optical axis 8, in order to thus zoom into the object 3 more or less strongly. The optical components 4 and 6 are combined with a front lens 23 in a compact objective 26. The front lens 23 is designed as a scattering lens and thus enables a comparatively large working distance 11 between the front lens 23 and the object 3. Together with the image sensor 9 illustrated in FIG. 2, these components 4, 6, and 23 form a video camera 2.

As shown in FIG. 1, by tuning the focus lens 6 (which can be designed either as a lens displaceable along the z-axis 8 and/or as a tunable lens), the present focal plane 12 can be displaced, for example, step-by-step in a step width 15 of $\Delta z_1$ in positive scanning direction 29 (i.e., in the positive z-direction 8—cf. FIG. 1) along the optical z-axis 8.

If the focus lens 6 shown in FIG. 2 is designed, for example, as a displaceable lens and if it is displaced at continuous movement speed along the z-axis 8, the present focal plane 12 will thus also accordingly be continuously displaced along the z-axis 8, wherein this movement can depend nonlinearly on a present z-position of the focus lens 6. By reading the image sensor 9 at regular time intervals, upon the continuous displacement of the present focal plane 12, an entire set of different (present) focal planes 12 can thus be optically scanned in each case, as illustrated by the dashed vertical lines in FIG. 1. By selecting the tuning speed of the focus lens 6 and/or the readout frequency of the image sensor 9, therefore not only the respective length 16 of the scanning range 14 traveled in the respective z-scan 17 can be adapted, but also the effective step width 15, thus the distance between two adjacent focal planes 12 which are scanned in the scope of such a z-scan 17 with the aid of the image sensor 9.

FIG. 3 shows a greatly simplified possible curve of an image sharpness (vertical axis) as a function of the z-coordinate. As can be seen, it can occur in real application situations that in addition to a global maximum 22 of the image sharpness, further local maxima 21 also exist. The best focal plane 13 illustrated in FIG. 1 corresponds here to the global maximum 22 of the image sharpness in FIG. 3. That is to say, when the focus lens 6 is tuned so that the present focal plane 12, as illustrated in FIG. 1, is positioned at the present working distance 11 of the object 3 from the front lens 23, the object 3 is thus imaged in optimum image sharpness on the image sensor 9. In other words, the best focal plane 13 therefore corresponds just to that focal plane 12 scanned with the aid of the imaging system 1 which is closest to the plane in which the object 3 is located. As FIG. 4 shows, the best focal plane 13, which is determined using an autofocus method according to the invention, can still deviate somewhat from the actual best focal plane 13*, because the latter cannot be determined with arbitrarily high z-resolution.

As explained hereinafter, the controller 10 of the imaging system 1 is configured to implement an autofocus method according to the invention. For this purpose, the controller 10 activates the focus actuator 7 and/or the zoom actuator 5 accordingly, and does so depending on which zoom level is presently set with the aid of the zoom actuator 5 (for example in reaction to a preceding input of the user of the imaging system 1) and/or depending on a present estimated value for the (actual) working distance 11, which presently exists between the imaging system 1 and the object 3.

It is to be considered in this case that in a typical application situation, thus, for example, if the imaging system 1 is designed in the form of an exoscope and is positioned at the end of a robot arm at different working distances 11 to the object 3 to be observed, both the zoom level (depending on the desire of the user) and also the working distance 11 can change from situation to situation. In order to accelerate finding the best focal plane 13 in such situations, the controller 10 selects both the length 16 of the scanning range 14, within which a specific number of focal planes 12 is scanned, and therefore also the number of these focal planes 12 independently. Furthermore, the controller 10, depending on the situation, also adapts the optical zoom level of the imaging system 1 which is used during the described z-scan 17, thus when the imaging system 1 scans the different focal planes 12.

For this purpose, the controller 10 checks which zoom level is currently set and moreover queries a current estimated value for the working distance 11 between the imaging system 1 and the object 3. To ascertain the estimated value for the working distance 11, the controller 10 can evaluate, for example, an additional item of location information, which has a reference to the present spatial location of the imaging system 1, for example a current position of a robot arm, on which the imaging system 1 is fastened and using which the imaging system 1 is moved in space relative to the object 3. Alternatively or additionally thereto, however, the imaging system 1 can also have an additional sensor, for example a contactless distance sensor, or, for example, an additional camera. This is because such devices can also be used to ascertain a current estimated value for the working distance 11 in each case.

For example, FIG. 4 shows that when the object 3 is located at a comparatively short working distance $z_1$, the resulting depth of field (DOF) is small, while the depth of field enlarges when the working distance enlarges, for example to the value $z_2$. The controller accordingly shrinks the length 16 of the scanning range 14 and thus also reduces the number of scanned focal planes 12 within the scanning range 14 when the estimated value for the working distance 11 decreases. In this case, for example, the step width 15 between the individual scanned focal planes 12 can be maintained. An improvement of the z-resolution when finding the best focal plane 13 is in particular achieved, however, as illustrated in FIG. 4, when the step width 15 is reduced upon decrease of the estimated value for the working distance 11 (either alternatively or additionally to the adaptation of the length 16 of the scanning range 14). This suggests itself in particular if the scanning range 14 is traversed step by step in that the location of the respective focal plane 12 is displaced step-by-step in a step width 15 (for example $\Delta z_1$ as illustrated on the left in FIG. 4).

In addition, it is reasonable to consider the presently set optical zoom level of the imaging system 1 to accelerate the finding of the best focal plane 13. If the zoom level has increased, for example, i.e., if a large zoom focal length is presently used (telephoto), so that only a small image detail of the object 3 is imaged on the image sensor 9 and accordingly a high magnification of the object 3 is achieved, it thus makes sense to shrink the length 16 of the scanning range 14 or to reduce the number of scanned focal planes 12 within the scanning range 14. This is because the depth of field will decrease at high optical zoom level, similarly as with a comparatively short working distance 11, so that the best focal plane 13 has to be found in a smaller z-range along the optical z-axis 8.

As already explained, the scanning range 14, which is illustrated in FIG. 1, can also be continuously traversed, in that the location of the focal plane 12 is continuously displaced within the scanning range 14, while the image sensor 9 is read out. For example, for this purpose the focus lens 6 can be moved at constant movement speed. In contrast, if the focus lens 6 is designed as a tunable liquid lens, the location of the focal plane 12 can thus be displaced continuously along the z-axis 8 by continuously tuning the focus lens 6. In such cases, the mean scanning speed at which the location of the focal plane 12 is displaced along the z-axis 8 can be adapted as a function of the presently set optical zoom level and/or an estimated value for the (present) working distance 11. The controller 10 can thus reduce the scanning speed upon increase of the zoom level and accompanying increased image magnification and/or upon decrease of the estimated value for the working distance 11. This is because if the image sensor 9 is read out at a constant (for example maximum image) frequency during the continuously executed z-scan 17, the z-resolution thus increases with decreasing scanning speed, because then the z-distances between the individual focal planes 12, which are each scanned during the readout of the image sensor 9, decrease. In other words, by reducing the scanning speed for a given maximum image frequency of the image sensor 9, the z-resolution in the determination of the best focal plane 13 can thus be increased.

The image sensor 9 can also, however, be operated in a rolling shutter mode, for example. In this case, different image areas 20*a*, 20*b*, and 20*c* of individual images 19, which are acquired using the image sensor 9, can correspond to different z-positions $z_1$, $z_2$, $z_3$ along the optical z-axis 8, as illustrated in FIG. 6, the block arrow indicating the direction of the rolling shutter therein. In this case, an evaluation area 21 within the respective individual image 19, which is evaluated by the controller 10 to assess the respective focal plane 12, can be adapted, for example, as a function of a mean scanning speed of the z-scan 17 and/or a number of focal planes 12 to be acquired within the scanning range 14. For example, it makes sense to shrink the evaluation area 21 in the vertical direction in FIG. 6 (thus in the direction of the rolling shutter) when the scanning speed is increased. This is because in this case a larger z-area is covered in the acquisition of a single individual image 19 (i.e., a larger scanning distance is optically traversed in the z-direction during the acquisition of the individual image 19), so that the evaluation area 21 is to be shrunken to maintain a high z-resolution.

As already illustrated in FIG. 1, at least two z-scans 27, 28 can also be executed in succession within the scanning range 14 to find the best focal plane 13. The two z-scans 27, 28 can differ here in their respective length 18 and also the respective step width 15 used or, for example, also in the scanning speed used and not least also in their respective location (for example mean z-position) within the scanning range 14. In the example of FIG. 1, a first coarse z-scan 27 (having comparatively large distance between the individual optically scanned planes 12) extends over the entire length 16 of the scanning range 14. The fine scan 28 executed thereafter with respect to time, in contrast, has a smaller step width 15 $\Delta z_2 < \Delta z_1$ in relation to the first coarse scan 27 and a shorter length 18. Moreover, the coarse scan 27 is executed at a lower zoom level and thus with less image magnification than the fine scan 28. More precisely, to carry out the coarse scan 21, initially a minimal zoom level is set by the controller 10, which is settable by means of the zoom optics unit 4, and the coarse scan 27 is executed over the maximum possible scanning range 14 which can be covered by tuning the focus lens 6. Only then is there a return to a zoom level, which has previously been selected by a user to record a video image data stream, to carry out the following fine scan 28. Due to the smaller step width $\Delta z_2$ of the fine scan 28, the local z-resolution achievable using this scan is higher than that of the coarse scan 27 previously carried out. At the same time, finding the best focal plane 13 is accelerated with respect to time by this two-step procedure, since the fine scan is not over the entire scanning range 14, rather only within a smaller z-range previously identified with the aid of the coarse scan 27, in which the best focal plane 13 is located.

These individual method steps are illustrated once again in FIG. 7, wherein it is apparent on the basis of the black arrows that initially the individual focal planes 12 are approached step-by-step at the z-coordinates $z_1$ to $z_8$ and recorded with the aid of the image sensor 9 (=coarse scan 27, black block arrows), and that subsequently the first focal plane 12 of the fine scan 28 is approached at the z-coordinate $z_a$. From there, subsequently the fine scan 28 is carried out step-by-step up to the focal plane 12 at the z-coordinate $z_h$. The fine scan 28 thus takes place in the opposite scanning direction as the coarse scan 27.

In summary, to improve the accuracy and the speed of an autofocus method using which a present best focal plane 13 may be found in an automated manner, which enables a best possible image quality for an object 3 located at a specific working distance 11 to an optical imaging system 1, it is provided that at least one parameter used during a z-scan 17 be adapted in an automated manner as a function of a presently set optical zoom level and/or a current estimated value of the working distance 11. During the z-scan 17, a present location of a focal plane 12 of the optical imaging system 1 within a scanning range 14 is displaced along an optical z-axis 8 of the imaging system 1, wherein the individual focal planes 12 are each evaluated to identify the best focal plane 13 among them (cf. FIG. 4). This evaluation can preferably be carried out on the basis of image information which is acquired using the image sensor 9 of the imaging system 1 (=image-based autofocus).

LIST OF REFERENCE SIGNS

1 optical imaging system
2 video camera
3 object
4 zoom optics unit (displaceable or tunable)
5 zoom actuator
6 focus lens (displaceable or tunable)
7 focus actuator
8 optical z-axis
9 image sensor
10 controller
11 working distance (between 1 and 3)
12 (present) focal plane (specified by 1 or 6)
13 best focal plane (to image 3 optimally sharp on 9)
14 scanning range (along 8 with respect to 12)
15 step width (distance between 12, after step-by-step adaptation of the location of 12)
16 length (of 14)
17 z-scan within 14
18 length of 17
19 individual image (recorded using 9)
20 image area (within 19)
21 local maximum
22 global maximum
23 front lens
24 zoom lens
25 (bidirectional) control line
26 objective
27 coarse scan
28 fine scan
29 (present) scanning direction (of 17)

The invention claimed is:

1. An autofocus method for automated finding of a present best focal plane (13) associated with an object (3) which is visualized using the imaging system (1), the method comprising:

by tuning a focus lens (6) of an optical imaging system (1), displacing a location of a focal plane (12) of the optical imaging system (1) in a z-scan (17) within a scanning range (14) along an optical z-axis (8), and wherein finding the best focal plane (13) is accelerated by automatically adapting at least one parameter of the z-scan (17) as a function of at least one of a) a currently set optical zoom level of the imaging system (1), wherein the at least one parameter comprises at least one of i) a number of the focal planes (12) optically scanned using the z-scan (17), or ii) a spatial scanning frequency of the z-scan (17), or b) a current estimated value which is estimated for a working distance (11) between the imaging system (1) and said object (3), wherein the at least one parameter comprises at least one of i) a length (16) of a scanning range (14), ii) the number of the focal planes (12) optically scanned using the z-scan (17), iii) the spatial scanning frequency of the z-scan (17), iv) an adjustment speed of the focus lens (6), or v) an optical zoom level of the imaging system (1) used during the z-scan (17); and increasing the spatial scanning frequency of the z-scan (17) when the length of the scanning range (14) of the z-scan (17) is shortened.

2. The autofocus method as claimed in claim 1, wherein by adapting the at least one parameter at least one of a) a depth of field is actively adapted by changing a zoom level of the imaging system (1), or b) a present change of the depth of field is compensated for, by adapting at least one of a spatial scanning frequency or a length (16) of the z-scan (17).

3. The autofocus method as claimed in claim 1, wherein the estimated value for the working distance (11) is ascertained using at least one of a) an additional sensor, b) an additional item of location information with respect to a present spatial location of the imaging system (1), or c) an additional camera.

4. The autofocus method as claimed in claim 1, wherein the at least one parameter comprises the optical zoom level, and upon increase of the optical zoom level at least one of a) a length (16) of the scanning range (14) is shrunken or b) a number of scanned focal planes (12) within the scanning range (14) is reduced.

5. The autofocus method as claimed in claim 1, wherein upon decrease of the estimated value for the working distance (11), at least one of a) the length (16) of the scanning range (14) is shrunken, or the number of scanned focal planes (12) within the scanning range (14) is reduced.

6. The autofocus method as claimed in claim 1, wherein the scanning range (14) is traversed step-by-step in that the location of the focal plane (12) is displaced step-by-step in a step width (15) and wherein the step width (15) is adapted as a function of the presently set optical zoom level and/or the estimated value for the working distance (11), wherein the step width (15) is reduced upon increase of the zoom level and accompanying increasing image magnification and/or upon decrease of the estimated value for the working distance (11).

7. The autofocus method as claimed in claim 1, wherein the scanning range (14) is continuously traversed in that the location of the focal plane (12) is continuously displaced within the scanning range (14), by at least one of a) the focus lens (6) moving at constant movement speed, b) the focus lens (6) moving continuously, or c) the location of the focal plane (12) being displaced continuously along the z-axis, and a mean scanning speed, at which the location of the focal plane (12) is displaced along the z-axis (8), is adapted as a function of at least one of a presently set optical zoom level or an estimated value for the working distance (11), so that the scanning speed is reduced at least one of a) upon increase of the zoom level and accompanying increasing image magnification, or b) upon decrease of the estimated value for the working distance (11).

8. The autofocus method as claimed in claim 1, wherein the scanning range (14) is continuously traversed in that the location of the focal plane (12) is continuously displaced within the scanning range (14), and the method further comprising operating an image sensor (9), via which the different focal planes (12) are acquired or scanned as individual images (19), in a rolling shutter mode, so that different image areas (20*a*, 20*b*, 20*c*) of these individual images correspond to different z-positions (z1, z2, z3) along the optical z-axis (8), since the respective individual image (19) is recorded while the location of the focal plane (12) changes, and adapting an evaluation area (21) within the respective individual image (19), which is evaluated by a controller (10) to assess the respective focal plane (12) and thereby to accelerate finding the best focal plane (13), as a function of at least one of a) a mean scanning speed or b) the number of focal planes (12) to be acquired.

9. The autofocus method as claimed in claim 1, wherein to find the best focal plane (13), at least two z-scans (27, 28) are carried out in succession within the scanning range (14), and in each case the location of a current focal plane (12) is displaced within the scanning range (14), wherein the two z-scans (27, 28) differ by at least one of a respective length (18), a step width (15) used, a scanning speed used, or a respective location within the scanning range (14).

10. The autofocus method as claimed in claim 1, wherein to find the best focal plane (13), at least two z-scans (27, 28) are carried out in succession within the scanning range (14), and the at least two z-scans (27, 28) comprise a coarse scan (27) and a fine scan (28) following with respect to time, the coarse scan (27) takes place at a lower zoom level at lower image magnification than the fine scan (28).

11. The autofocus method as claimed in claim 1, wherein to find the best focal plane (13), at least two z-scans (27, 28) are carried out in succession within the scanning range (14), and the at least two z-scans (27, 28) comprise a coarse scan (27) and a fine scan (28) following with respect to time, and at least one of:

a local z-resolution of the fine scan (28) is higher than a local z-resolution of the coarse scan (27), a length (18*a*) of the coarse scan (27) is greater than a length (18*b*) of the fine scan (28), a step width (15*a*) of the coarse scan (27) is greater than a step width (15*b*) of the fine scan (28), or a scanning speed of the coarse scan (27) is higher than a scanning speed of the fine scan (28).

12. An optical imaging system (1) for visualizing an object (3) during a medical intervention, the optical imaging system comprising:

a zoom optics unit (4), which is adjustable by a zoom actuator (5), to adapt an optical zoom level, a focus lens (6), which is tunable by a focus actuator (7), to adapt a location of a focal plane (12) along an optical z-axis (8) during a z-scan (17), an image sensor (9) for recording image data, and a controller (10) for activating the focus actuator (7), wherein the controller (10) is configured to implement an autofocus by activating at least one of i) the focus actuator (7) or ii) the zoom actuator (5) as a function of at least one of:

a) a zoom level presently set with the zoom actuator (5), wherein the controller (10) adapts a number of the focal planes (12) optically scanned using the z-scan (17) or a spatial scanning frequency of the z-scan (17), or b) an estimated value for a present working distance (11) between the imaging system (1) and the object (3), wherein the controller (10) adapts at least one parameter comprising at least one of:

(i) a length (16) of a scanning range (14), (ii) a number of the focal planes (12) optically scanned using the z-scan (17), (iii) a spatial scanning frequency of the z-scan (17), (iv) an adjustment speed of the focus lens (6), or (v) an optical zoom level of the imaging system (1) used during the z-scan (17); and the controller is further configured to increase the spatial scanning frequency of the z-scan (17) when the length of the scanning range (14) of the z-scan (17) is shortened.

13. The optical imaging system (1) as claimed in claim 12, wherein the controller (10) is configured to activate the at least one of the focus actuator (7) or the zoom actuator (5) in order to carry out an autofocus method to determine a present best focal plane (13) including the steps of by tuning the focus lens (6), displacing a location of the focal plane (12) in a z-scan (17) within a scanning range (14) along the optical z-axis (8), and automatically adapting at least one parameter of the z-scan (17) as a function of at least one of a) a currently set optical zoom level of the imaging system (1) or b) a current estimated value for a working distance (11) between the imaging system (1) and an object (3) visualized using the imaging system (1), to thus accelerate finding the best focal plane (13).

14. The method as claimed in claim 9, wherein the two z-scans (27, 28) at least partially overlap.

15. The method as claimed in claim 10, wherein at least one of a) before carrying out the coarse scan (27), initially a minimal zoom level is set, or b) the coarse scan (27) is executed over a maximum possible scanning range (14).

* * * * *